United States Patent

Minshull et al.

[15] 3,681,762

[45] Aug. 1, 1972

[54] AUTO-SEQUENCING ASSOCIATIVE STORE

[72] Inventors: John F. Minshull, Winchester; Alan S. Murphy, Chandlers Ford, both of England

[73] Assignee: International Business Machines Corporation, Armonk, N.Y.

[22] Filed: Oct. 19, 1970

[21] Appl. No.: 82,043

[30] Foreign Application Priority Data

Nov. 27, 1969 Great Britain.............57,983/69

[52] U.S. Cl.................................................340/172.5

[51] Int. Cl. ...........G06f 9/20, G06f 9/16, G06f 7/00

[58] Field of Search...................................340/172.5

[56] References Cited

UNITED STATES PATENTS

| | | | |
|---|---|---|---|
| 3,483,528 | 12/1969 | Koerner | 340/173 |
| 3,320,594 | 5/1967 | Davies | 340/172.5 |
| 3,585,605 | 6/1971 | Gardner | 340/172.5 |
| 3,395,393 | 7/1968 | Githens | 340/172.5 |
| 3,391,390 | 7/1968 | Crane et al. | 340/172.5 |
| 3,576,436 | 4/1971 | Lindquist | 235/168 |

*Primary Examiner*—Paul J. Henon
*Assistant Examiner*—Jan E. Rhoads
*Attorney*—Hanifin and Jancin and John C. Black

[57] ABSTRACT

An auto-sequencing associative store provides outputs during a read operation which at least partially forms the search argument for the next store cycle to improve the speed of operation in a data processor.

10 Claims, 14 Drawing Figures

| | KEY | | P1 | P2 | Q1 | Q2 | NEW KEY | | Z1 | Z2 | Z3 | Z4 | Z5 | |
|---|---|---|---|---|---|---|---|---|---|---|---|---|---|---|
| LINE 0 | 0 | 0 | 0 | 0 | 0 | 0 | 0 | 0 | 0 | 1 | 0 | 0 | 1 | MODE A DECODE |
| | 0 | 0 | 0 | 0 | 0 | 1 | 0 | 0 | 0 | 0 | 1 | 0 | 0 | |
| | 0 | 0 | 0 | 0 | 1 | X | 0 | 0 | 0 | 1 | 0 | 1 | 0 | |
| | 0 | 0 | 0 | 1 | X | X | 0 | 0 | 1 | 0 | 1 | 1 | 0 | |
| | 0 | 0 | 1 | 0 | X | X | 0 | 0 | 1 | 0 | 1 | 0 | 1 | |
| LINE 5 | 0 | 1 | 0 | X | X | X | 0 | 1 | 0 | 0 | 0 | 0 | 1 | MODE B DECODE |
| | 0 | 1 | 1 | 0 | X | X | 0 | 1 | 0 | 0 | 0 | 1 | 0 | |
| | 0 | 1 | 1 | 1 | 0 | 0 | 0 | 1 | 1 | 1 | 1 | 1 | 1 | |
| LINE 8 | 1 | 0 | 0 | 0 | X | 0 | 0 | 0 | 0 | 0 | 0 | 1 | 1 | MODE C DECODE |
| | 1 | 0 | 0 | 0 | X | 1 | 1 | 0 | 0 | 0 | 1 | 1 | 0 | |
| | 1 | 0 | X | 0 | X | X | 1 | 0 | 0 | 0 | 1 | 1 | 1 | |
| | 1 | 0 | 1 | 1 | 0 | 0 | 1 | 0 | 1 | 1 | 1 | 1 | 1 | |
| LINE 12 | 1 | 1 | 0 | 1 | X | X | 1 | 1 | 1 | 1 | 0 | 0 | 0 | MODE D DECODE |
| | 1 | 1 | X | 0 | X | X | 1 | 1 | 1 | 1 | 0 | 0 | 1 | |
| | 1 | 1 | 1 | 1 | 0 | 1 | 1 | 1 | 1 | 1 | 1 | 1 | 1 | |
| | 1 | 1 | 1 | 1 | 1 | 0 | 1 | 1 | 1 | 1 | 1 | 1 | 1 | |
| LINE 16 | X | X | 1 | 1 | 0 | 0 | 0 | 0 | 0 | 0 | 0 | 0 | 0 | MODE CHANGE |
| | X | X | 1 | 1 | 0 | 1 | 0 | 1 | 0 | 0 | 0 | 0 | 0 | |
| | X | X | 1 | 1 | 1 | 0 | 1 | 0 | 0 | 0 | 0 | 0 | 0 | |
| LINE 19 | X | X | 1 | 1 | 1 | 1 | 1 | 1 | 0 | 0 | 0 | 0 | 0 | |

INVENTORS
JOHN F. MINSHULL
ALAN S. MURPHY
BY John C Black
ATTORNEY

INPUT: KEY, P1 P2 Q1 Q2, NEW KEY — SEARCH; Z1 TO Z5 OUTPUT — READ

| | KEY | P1 P2 Q1 Q2 | NEW KEY | OUTPUT (Z1 TO Z5) |
|---|---|---|---|---|
| | 0 0 | DECODE MODE A | | |
| | 0 0 | 1 1 0 1 | 0 1 | 0 0 0 0 1 |
| | 0 0 | 1 1 1 0 | 1 0 | 0 0 0 0 1 |
| | 0 1 | DECODE MODE B | | |
| | 0 1 | 1 1 1 1 | 1 1 | 0 0 0 0 1 |
| | 1 0 | DECODE MODE C | | |
| LINE M | 1 0 | 1 1 1 1 | 1 1 | 0 0 0 0 1 |
| | 1 1 | DECODE MODE D | | |
| N | 1 1 | 1 1 0 0 | 0 0 | 0 0 0 0 1 |
| N+1 | 0 0 | 1 1 X X | 0 0 | 0 0 0 0 0 |
| N+2 | 0 1 | 1 1 X X | 0 1 | 0 0 0 0 0 |
| N+3 | 1 0 | 1 1 X X | 1 0 | 0 0 0 0 0 |
| N+4 | 1 1 | 1 1 X 1 | 1 1 | 0 0 0 0 0 |
| N+5 | 1 1 | 1 1 1 X | 1 1 | 0 0 0 0 0 |

FORBIDDEN TRANSITION TABLE (rows N+1 to N+5)

PATENTED AUG 1 1972 3,681,762

SHEET 09 OF 11

AUTO-SEQUENCING ASSOCIATIVE STORE

BACKGROUND OF THE INVENTION

An associative store is a store comprising a plurality of word registers arranged so that a word register is selected for accessing in accordance with the contents of the register, rather than, as in other stores, in accordance with the position of the word register in the store. Selection of a word register in an associative store is, in most cases, the result of an operation which will be called Search. A Search argument is compared with the contents of a selected field of the word registers and those registers of which the contents of the selected field match the search argument are selected for accessing. Each word register has an associated selector trigger and is selected for accessing when its selector trigger is set to a given stable state.

It has been found that associative stores containing function tables on which table-look-up operations are performed provide a practical approach to data processing system design. A description of a simple data processing system using associative stores is to be found in the specification of copending U.S. application of P. A. E. Gardner et al., Ser. No. 828,503, filed May 28, 1969, now U.S. Pat. No. 3,585,605, and assigned to the assignee of the present application. Said patent is hereby incorporated herein by reference could, in some circumstances, be improved if an associative store were to perform a sequence of operations under at most partial external control. It is to the provision of such an auto-sequencing associative store that this invention is directed.

SUMMARY OF THE INVENTION

According to the invention an auto-sequencing associative store comprises an input register for storing a search argument for use in a search operation, and outputs arranged so that a portion of the data emitted by the store as a result of a read operation is entered into the input register as at least part of a search argument of a subsequent search operation performed by the store.

The associative store preferably, although not necessarily, is similar to the store described in British Pat. No. 1,186,703 published Apr. 2, 1970 which corresponds to U.S. Pat. No. 3,609,702, issued Sept. 28, 1971, which latter patent is hereby incorporated herein by reference. The store therein described is capable of performing the operations Search, Next, Read and Write. The Next operation causes the transfer of the settings of each selector trigger to the selector trigger of the adjacent word register in a given direction. The operation may be combined with a Search operation or may be used alone. For example, assume that the word registers are numbered consecutively. If the selector trigger of register N is set, the operation Next resets the selector trigger of register N and sets the selector trigger of register N+1. If a Search operation would have resulted in the selector trigger of register N being set, the combination Seard, Next, results in the selector trigger of register N+1 being set.

The auto-sequencing store of the present specification uses an operation called Previous, in which the direction of transfer of the setting of a selector trigger is the opposite to that in the operation Next. If the selector trigger of register N is set, the Previous operation causes the selector trigger of register N−1 to be set.

In an associative store the field of the search argument of a search operation is delimited by a mask register which contains triggers, which by their settings select those orders of the word registers to be examined for a match with the search argument. The field defined by the mask register is called the search field. The mask register is controlled by externally generated control signals, and also defines the field over which a Read or Write operation is to take place. The operation cycle of the associative store is as described in the above British patent in two parts, in the first of which a Search over a search field and/or a Next or Previous operation takes place and in the second of which a Read or Write operation takes place. The store may be arranged so that the Read or Write field comprises those orders of the word registers which are not used in the search field. Only one mask is then used each store c cycle. It is preferred, however, to define the search field at the beginning of the first part of a store cycle and the read or write field at the beginning of the second part of the cycle. This gives greater flexibility in the choice of fields.

It is possible that as a result of the Search operation several word registers are selected for accessing. In this case if the operation to be performed on the selected registers is a Read operation the contents of the Read fields of all the selected registers are read out simultaneously resulting in effectively an or operation on the accessed data. If the operation is Write, the data to be written is entered simultaneously into all the selected registers.

The operation or combination of operations that the store is to perform on each cycle is defined by control data which may be supplied in any suitable way to a decoder which forms part of the store. In the particular description which follows different examples of how a store is controlled are given.

A further desirable but non-essential feature of an associative store to which this invention is applied is that the storage cells of which the store is comprised are four-state cells capable of assuming states representing binary digits 1 and 0, and in addition what will be called respectively X and Y states. The X state is such that when the contents of a storage cell is being compared with a search argument, the cell does not generate a mismatch signal whether the search argument be a binary 1 or 0. The Y state is the converse of the X state and is such that a cell in the Y state always generates a mismatch whatever is the search argument. A suitable four-state cell is described in British Pat. No. 1,127,270, published Sept. 18, 1968.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
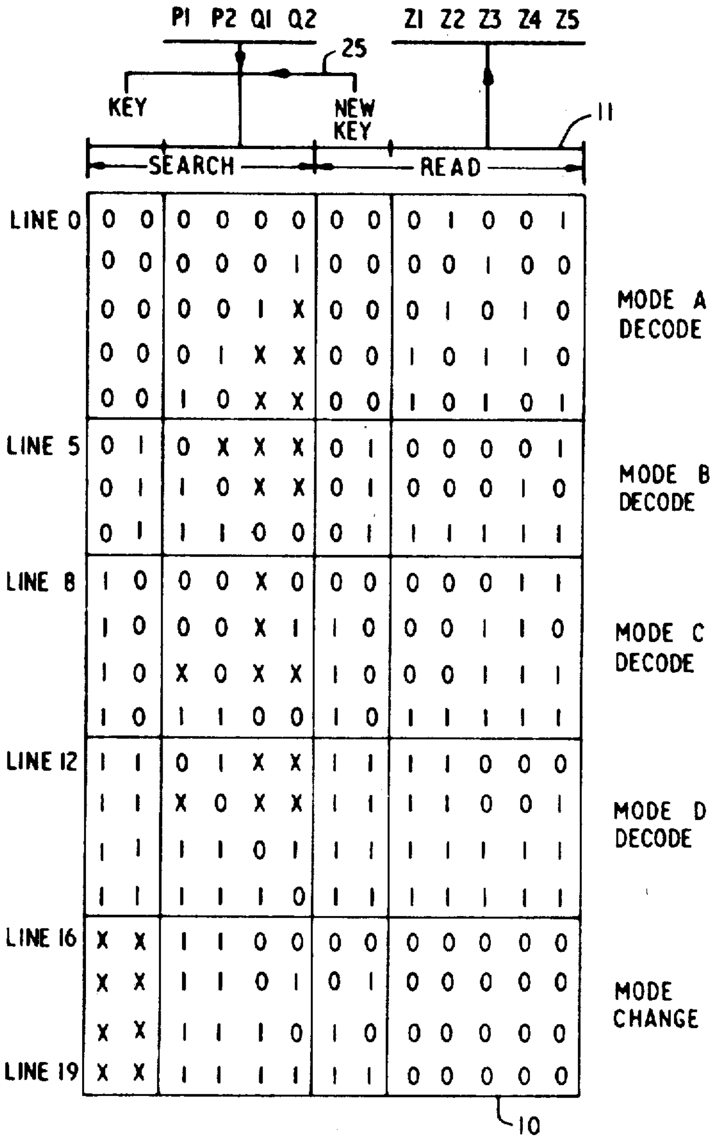
FIGS. 1, 3, 5, 6, 8, 9, 10, 12, and 14, show different arrangements of auto-sequencing associative stores according to the invention.

FIG. 1 shows schematically an auto-sequencing associative store 10 according to the invention which contains a twenty line decoding function table for generating a five bit output, Z1 to Z5, from a four bit input P1, P2, Q1, Q2, the output depending not only on the input but also on the mode in which the store is operating. The store operates in one of four modes, A to D, and the only permissible mode changes are shown diagrammatically in FIG. 2. For example, when in mode B the store can change to mode C or mode D, but not mode A (i.e., line 7 given an error signal at Z1–Z5).

Store 10 is thirteen bits wide and comprise an input-output register 11 containing a two-bit Key field, a four-bit Input field, a two-bit New Key field and a five-bit Output field. A data bus 25 connects the New Key and Key fields. The store performs a fixed combination of operations, namely Search and Read, and has a fixed mask which is such that the Search operation uses as a search argument the Key and Input fields of register 11 and the Read operation causes read-out of corresponding fields of selected lines of the function table into the New Key and Output fields. The contents of the New Key field are immediately transferred to the Key field to act as part of the search argument for the next Search operation.

In FIG. 1 and throughout this specification, unless otherwise stated, it can be assumed that one line of a function table occupies one word register. A data cell is represented in the figure by its data content, in this example 1, 0 or X.

Figure 2:
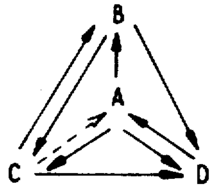
FIG. 2 and 4 are mode-transition diagrams illustrating operation of the stores of FIGS. 1 and 3, respectively.

The decoder operates according to the following rules:

a. If P1, P2 are respectively 01 or 10, or 00, save for the special case (b), the four-bit input P1, P2, Q1, Q2 is decoded into a five-bit output Z1 to Z5 and the mode is not changed;
b. If P1, P2, Q1, Q2 is 0000 or 0010 and the mode is C, the mode is changed to A in addition to an output being provided;
c. If P1, P2 is 11, a change of mode occurs in accordance with the values of Q1, Q2 and the output is zero;
d. Mode changes other than those shown in FIG. 2 are forbidden. If a forbidden mod e change is attempted, an error pattern of Z1 to Z5 all ones is emitted.

The operation of the auto-sequencing store of FIG. 1 will now be explained in more detail in order to establish principles of operation which are used in the other examples of the invention described with reference to the remaining Figures.

Initially register 11 is clear, containing only binary zeros. The initial key is thus 00. If P1, P2 is 00 selection is made from lines 0 to 2 of the table. If Q1, !Q2 is 00, line 0 is selected and the output is 01001. If Q1 is 1, line 2 is selected whether Q2 is 1 or 0, since Q2 is compared in the Search operation with a cell in the X state. A similar technique is used at lines 3 and 4 where the values of P1, P2 completely determine the output. For each of lines 0 to 4 the New Key is 00 which means that, under the assumption that the next P1, P2 input is not 11, the next output will be selected from lines 0 to 4.

If P1, P2 is 11 a selection is made from lines 16 to 19 of the table. The Key field of each of these lines consists of storage cells in the X state so that the lines can be selected whatever the values in the Key field of register 11. It will be seen that in lines 16 to 19 the values of Q1, Q2 are the same as the New Key fields. Q1, Q2 therefore determine the mode transition. If the attempted mode transition is forbidden not only is one of the lines 16 to 19 selected but also one of the lines 7, 11, 14, or 15 which contain the error signal in their output fields. Since selected lines are read-out simultaneously the output is the OR function of 00000 from one of lines 16 to 19, and 11111 from one of lines 7, 11, 14, or 15, which is the error signal 11111. This technique of combining the output fields of simultaneously selected lines is freely used in the other examples to be discussed.

The special case (b) is provided for by line 8 of the table which is selected if the mode C (Key 10) and if P1, P2 and Q2 are all zero. It is immaterial whether Q1 is 1 or 0 since the Q1 cell of line 8 is in the X state. Upon selection of line 8 a mode transition is made to mode A (New Key 00).

Figures 3, 4:
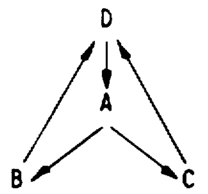

In the mode transition table of FIG. 1 there were relatively few forbidden transitions. Where there are a relatively large number of forbidden transitions the table design technique illustrated in FIG. 3 can be used. The permitted transitions between modes A and D are shown in FIG. 4. A valid transition is signalled by the output 00001 while a forbidden transition is signalled by the output 00000. The difference between the function tables of FIGS. 1 and 3 can be summed by saying that with the table of FIG. 1 all transitions are initially assumed valid and forbidden transitions are treated as special cases, whereas, with the table of FIG. 3 all transitions are assumed to be forbidden and valid transitions are treated as special cases. One of the consequences of this approach is illustrated by considering the transitions from mode C and from mode D. The only valid transition from mode C (Key 10) is to mode D (Key 11). The OR function of the two keys is 11 which is the required key to mode D. Transitions from mode C can be dealt with by selecting lines M and N+3 of the table if the transition is valid, and only line N+3 of the table if the transition is valid, and only line N+3 if the transition is invalid. However, the only valid transition from mode D to mode A requires a New Key of 00 and it is impossible to obtain this as the OR function of two different operands. Thus, line N only is selected if the transition is valid (Q1, Q2 are 00) but lines N+4 and N+5 are not selected due to the presence of 1's in the Q1, Q2 positions of the respective lines. Either or both lines N+4 and N+5 are selected if Q1, Q2 are not 00.

Figure 5:
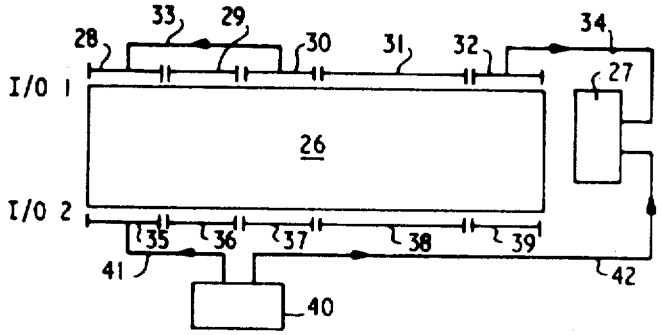

So far, an auto-sequencing store which generates part of its next search argument has been described. FIG. 5 shows schematically an arrangement of store which is capable of more complex auto-generated operating sequences. The associative store 26 has two input/output registers I/O 1 and I/O 2 from either of which a search argument can be taken and between either of which and the associative store 26 data transfer can take place. The store is driven by a decoder 27 which, in response to control data, determines the combination of operations to be performed in a store cycle, and for each part of the cycle which input/output register and which mask is to be used. Register I/O 1 is divided into fields 28 to 32. Fields 29 and 31 are the input and output data fields, respectively. Field 30 is a new Key field which is connected to Key field 28 by a bus 33. Field 32 is an operation control field which supplies control data emitted by the store over line 34 to decoder 27. Register I/O 2 is divided into fields 35 to 39. An external control which may be data generated by a microprogram or emitted by another associative store is connected by bus 41 to a Key field 35, and by bus 42 to decoder 27. Fields 36 and 38 are the input and output data fields, respectively, and fields 37 and 39 provide a means for loading from I/O 2 New Key and operation control data into the store 26.

The store 26 can be auto-sequenced from I/O 1, for fields 30 and 32 emit sufficient information to control the next operation cycle of the store even if the input data in field 29 is unchanged. I/O 2 provides the means whereby the store is externally controlled.

Figure 6:
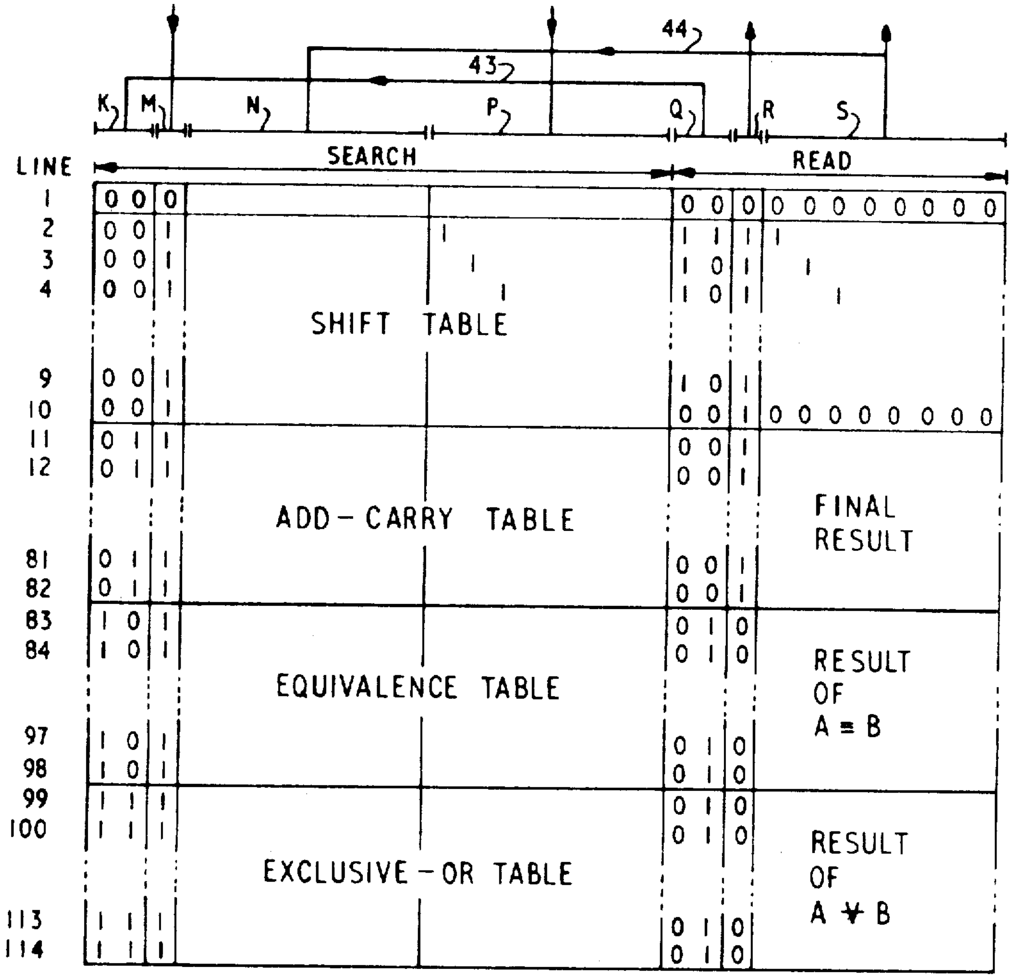

As an example of the auto-sequencing techniques so far described FIG. 6 shows an associative store with a function table for the performance of the statement:

If A < 0 THEN X = B+A ELSE X = B–A where A and B are eight-bit (one byte) operands with highest order bit a sign bit, 0 for positive and 1 for negative. The table consists of 114 lines, not all shown on FIG. 6 and consists of four subtables: shift, add-carry, equivalence and exclusive-OR tables.

Figure 7:
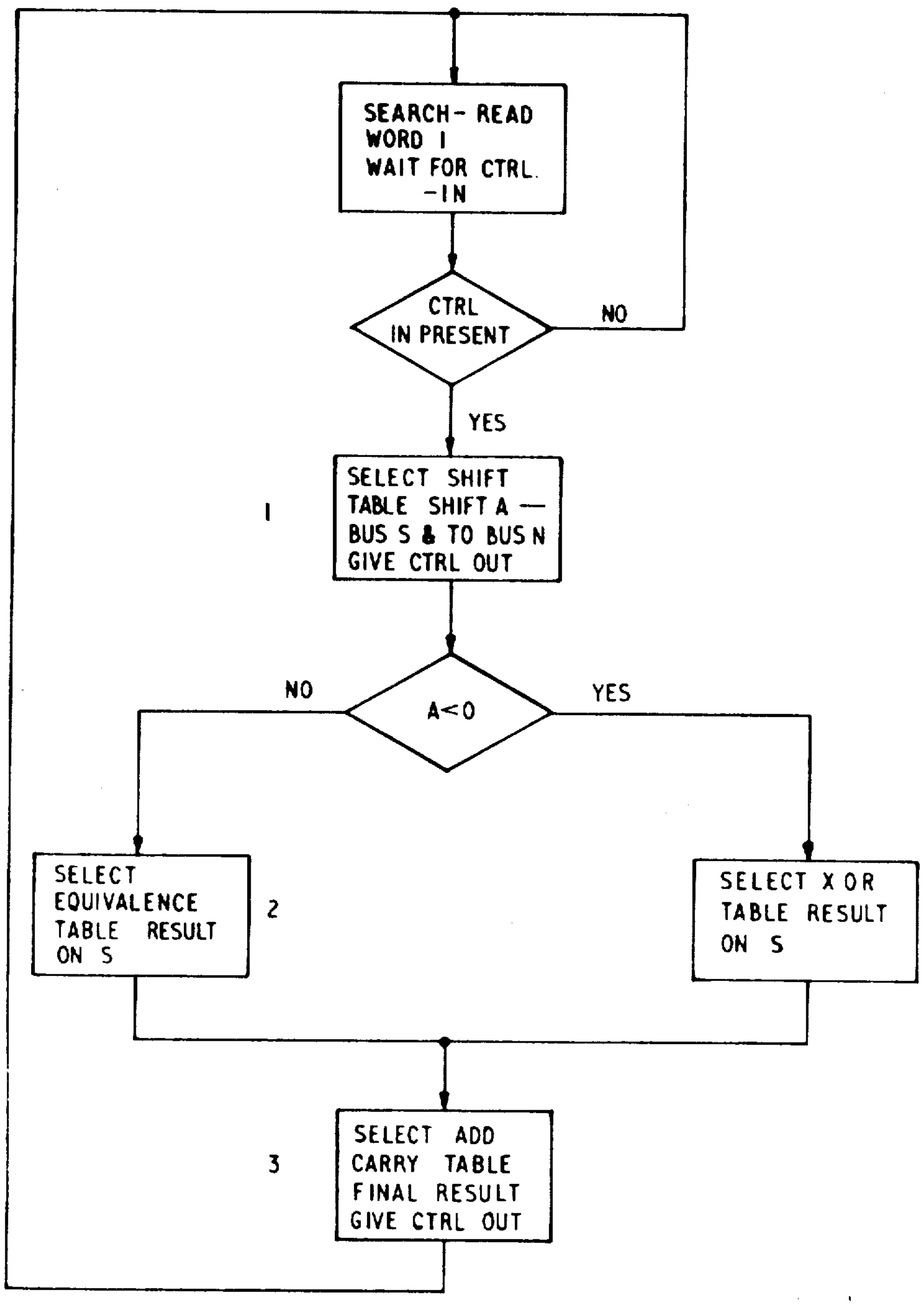
FIGS. 7, 11, and 13, are flow charts showing the sequence of functions performed by the auto-sequencing stores of FIGS. 6, 10, and 12, respectively.

It is well known that binary addition of two operands can be carried out by the steps of finding the exclusive-or function of the operands and using one of the operands and the exclusive-or function to give the resultant of the addition. The equivalence function of two binary operands, in which the resultant contains a one in each order which is the same in the two operands, is the same as the exclusive-or function of a negative and a positive operand. Combining the resultant of the equivalence function and one of the operands gives the result of the addition of a positive and a negative operand, that is the result of the subtraction of two operands. FIG. 7 is a flow diagram of the method used by the store of FIG. 6 to perform the statement set out above. In FIG. 6 full details of the sub-tables are not shown as they are not relevant to the invention which relates to the auto-sequencing characteristics of the store.

The input/output register and the storage array is divided into fields K, M. N, P, Q, R, and S. Field K is the Key field and is connected to New Key field Q by line 43. P is the input field and S is the output filed which is connected over line 44 to field N. M is a Control In field and must contain a 1 for the sequence of operations to start or continue. R is a Control Out field which signals a data source, as will be explained. In FIG. 6 and in the remaining Figures, unless otherwise stated, a blank position in a function table usually represents a cell in the X state.

The store is arranged to perform the fixed combination of operations Search over fields K, M, N, and P, and Read over fields Q, R, and S. The Q field read-out provides the K fields for the next search and the S field read-out provides the N fields for the next search. Initially with M field zero, the store idles, selecting line 1 and reading out its Q R, and S fields which are all zero. When a 1 is placed in M field and operand A is simultaneously in the P field, the shift table is selected since the K field is 00 and M is now 1. If A is negative the highest order bit is one and at least line 2 of the table will be selected resulting in a Q field of 11, irrespective of whether other lines are selected. The S field is operand A and this appears and the N field for the next search. Operand B is at this time placed in the P field of the input/output register. In the second store cycle with K field 11 the exclusive-OR table is accessed and the lines of the table which give the exclusive-OR function of operand A in field N and operand B in field P are selected for read-out. The resultant of the operation appears in field S and this is transferred to field N. The Q field is 01 which selects the add-carry table to complete the operation in a third cycle of the store. Operand B is maintained in field P during this cycle. The add-carry table emits the final result in the S field.

If, on the contrary, operand A is positive, its highest order bit is not 1 and line 2 of the table is not selected on the first cycle. In this cycle, the Q field read-out is 10, leading to the selection of the equivalence table on the second cycle. The equivalence table emits a Q field of 01 leading to the selection of the add-carry table in the third cycle.

The control out field is 1 at the end of the first cycle and when the final result is emitted. This may be interpreted as a call for operand B and then as an indication that the resultant is in the S field.

Figure 8:
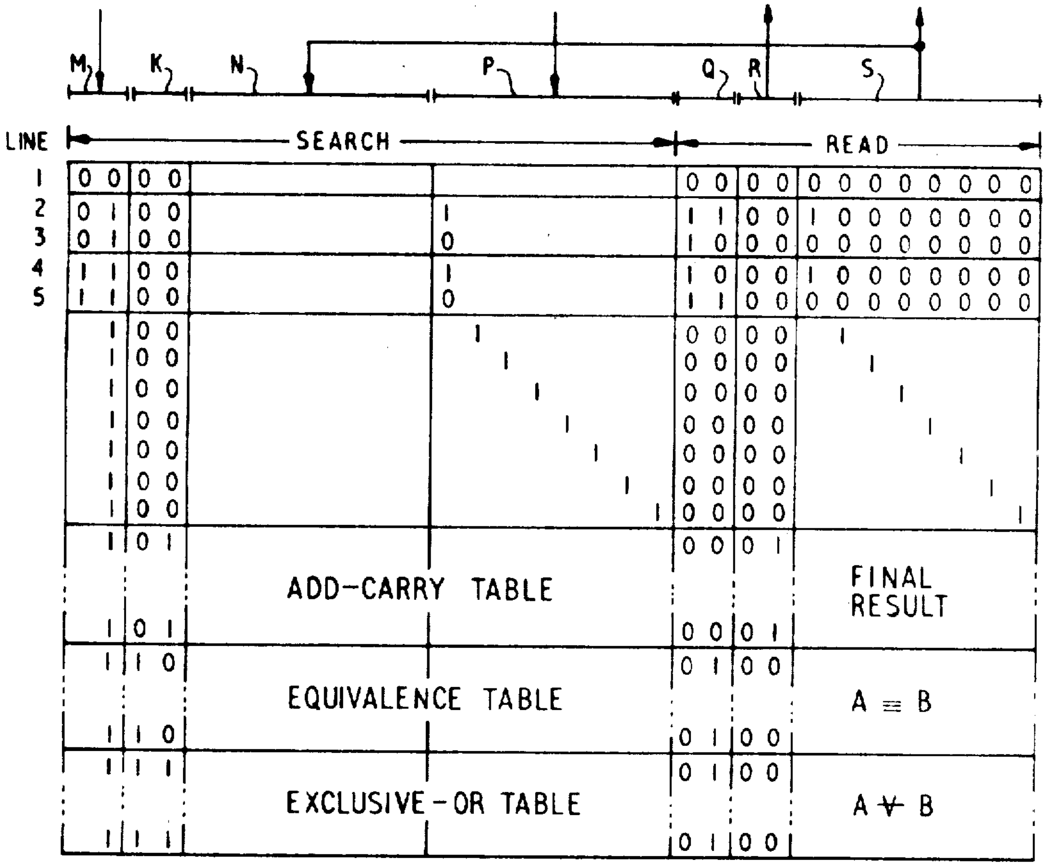

If the control in field M consists of more bits it is possible to combine and overlap the tables for two or more statements. An example is shown in FIG. 8. The store performs the same operations as the store of FIG. 7 and has the same fields, except that the M field consists of two bits. The tables shown are capable of executing the two statements.

Statement 1 IF A < 0 THEN X=B+A ELSE X=B–A

Statement 2 IF A > 0 THEN X=B+A ELSE X=B–A

The functions required for executing the two statements are provided by the add-carry, equivalence and exclusive-OR tables. Which statement is to be executed and which table is to be accessed first is determined by lines 2 to 5 of the store. If the field M is 01 the statement 1 is to be executed and a Q field of 11 from line 2 or 10 from line 3 is emitted as the key of the next search operation in accordance with whether the highest order bit of operand A is 1 or 0, respectively. If the M field is 11 the statement 2 is to be executed and a Q field of 10 from line 4 or 11 from line 5 is emitted in accordance with whether the highest order bit of operand A is 1 or 0, respectively.

It will be noted that this choice takes place at the same time as operand A is being shifted to the S field. The statements are executed in three cycles as described with reference to FIGS. 6 and 7.

Figure 9:
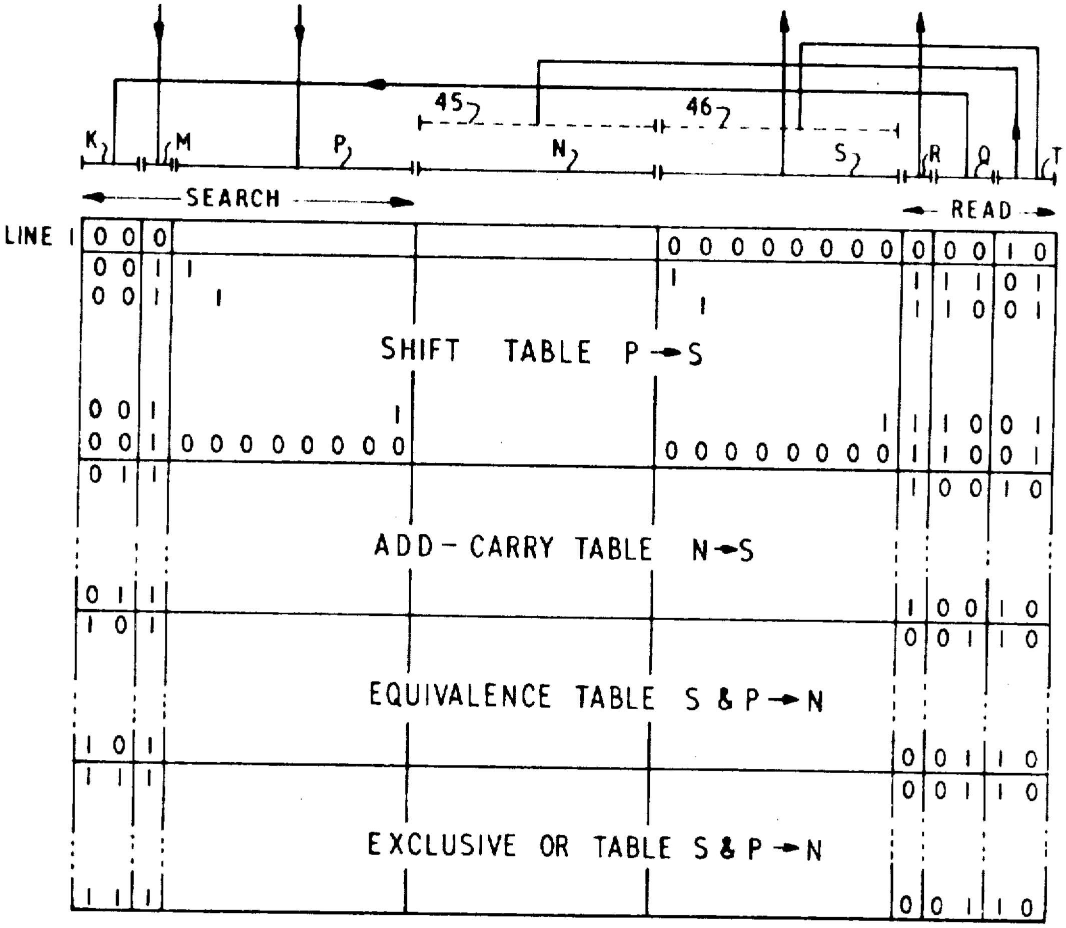

FIG. 9 is an example of an auto-sequencing associative store in which the output of the store on one cycle controls the fields over which the store is to search or read on the next cycle. The store is arranged to execute statement 1, described above, and has the same fields and tables although the tables are slightly modified as will be explained. The S field is not, however, connected to the N field. Additionally, there is a two-bit T field, the contents of which control sections 45 and 46 of the mask register corresponding respectively to fields N and S the left-hand bit of the T field controls mask register section 45 and the right-hand bit controls section 46. The arrangement is such that when the control bit is 0, the controlled section causes its corresponding field to be available for accessing but not for searching, and when the control bit is 1, the controlled section causes its corresponding field to be available for searching but not for accessing. As for the other stores described, the store cycle consists of the Search, Read combination of operations.

Initially, the store idles, repeatedly selecting Line 1. The T field is 10 which means that the N field is part of the search argument. Operand A is placed in the P field and a 1 in the M field. The shift table is selected, outputting operand A to the S field of the input/output register and determining from the sign of A, as described above, whether the equivalence or exclusive-or table is to be used next. The T field is 01 which causes the S field to be part of the search argument of the next cycle. This dispenses with the need to transfer the S field to the N field as in previous examples. The T field of the equivalence or exclusive-OR table is 10 which causes the search argument for the third cycle in the add-carry table to include the N field. In the add-carry table the result appears in the S field.

The T field could control the masking of individual orders, rather than, as described, groups of orders or could be arranged to select different masks each part of a store cycle. For example, each group of orders would be assigned to two bits of the T field, one of which determines if the orders are masked during the Search phase and the other if the orders are masked during the accessing phase.

Figure 10:
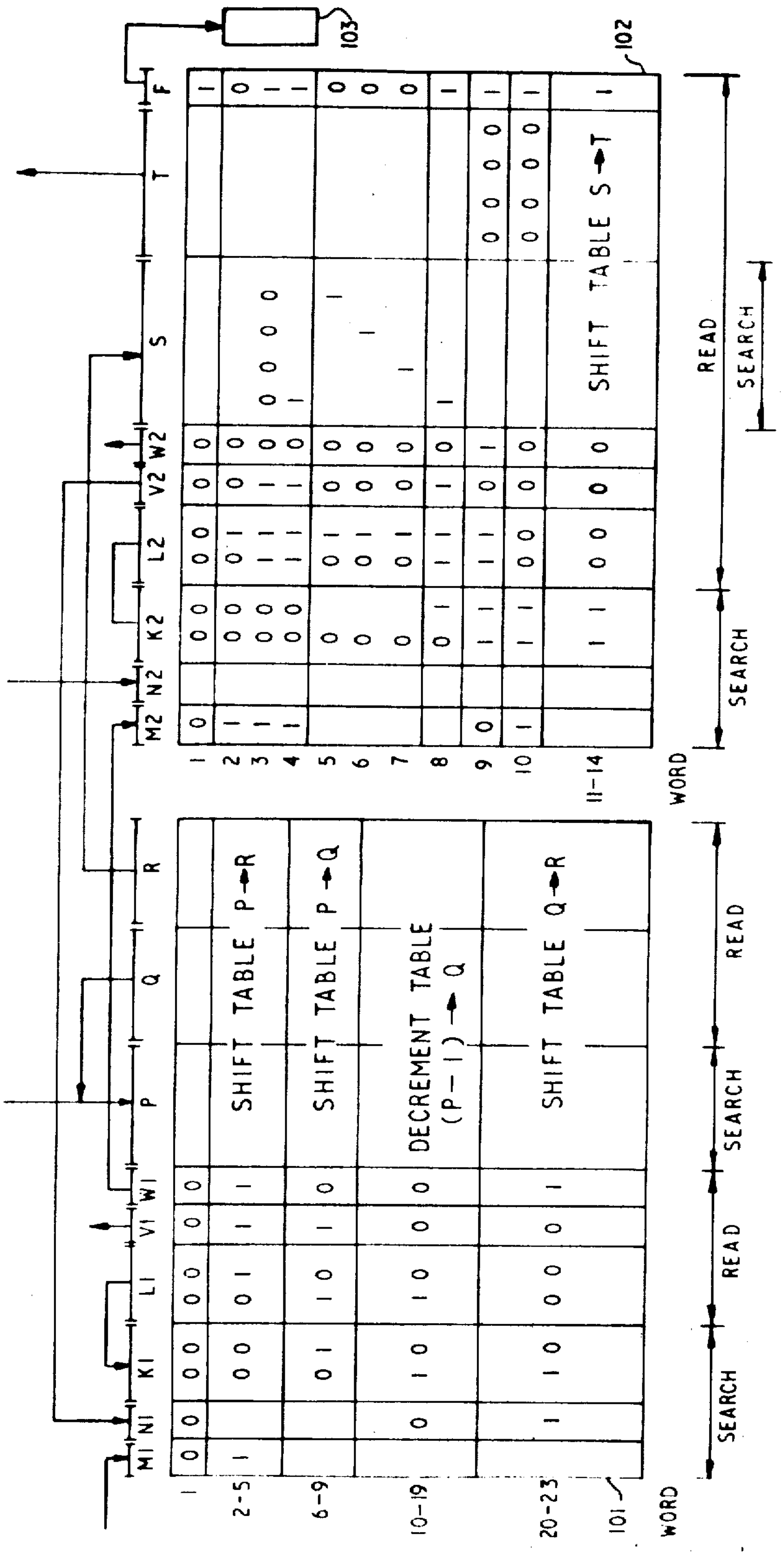

It is often expedient for one associative store to perform part of an operation sequence and then to pass the partial result to another store for the sequence to be completed. This is called pipelining and stores connected in this way are referred to as pipelined. FIG. 10 shows two pipelined stores 101 and 102. The control fields which lead to auto-sequencing are the fields M, N, K, L, V, W, and F. Since, if a store is one of a chain of pipelined stores, it may be necessary to transmit control signals to the adjacent stores in the chain, there are two control out fields V, W, respectively, for transmitting control information and two control in fields M, N for receiving control information. K is the key field and L the new key field. F is a function control field. As shown in FIG. 10, the control in field N1 of store 101 is connected to the control out field V2 of store 102, and the control out field W1 of store 101 is connected to the control in field M2 of store 102. The key and new key fields are connected in the usual way. In the application to be described, the operation on store 101 is unchanged so that only store 102 has an F field controlling the function decoder 103. Store 101 has data fields P, Q, and R, P being an input data field, receiving data from an external source or field Q, and R being an output data field. Store 102 has two data fields S and T, S being an input data field receiving data from field R and T being an output data field.

The application to be described is that of normalizing floating point data. The data consists of eight bits, the highest order four bits being the exponent and the remaining bits being a fractional binary number, i.e. the binary point is immediately to the left of the highest order bit of the number. Normalization is achieved when the highest order bit of the number is 1 so that the fraction has a decimal value between 0.5 and 1. If the highest order bit is zero the number has to be shifted left until it is normalized and the exponent decreased by one for each shift.

Figure 11:
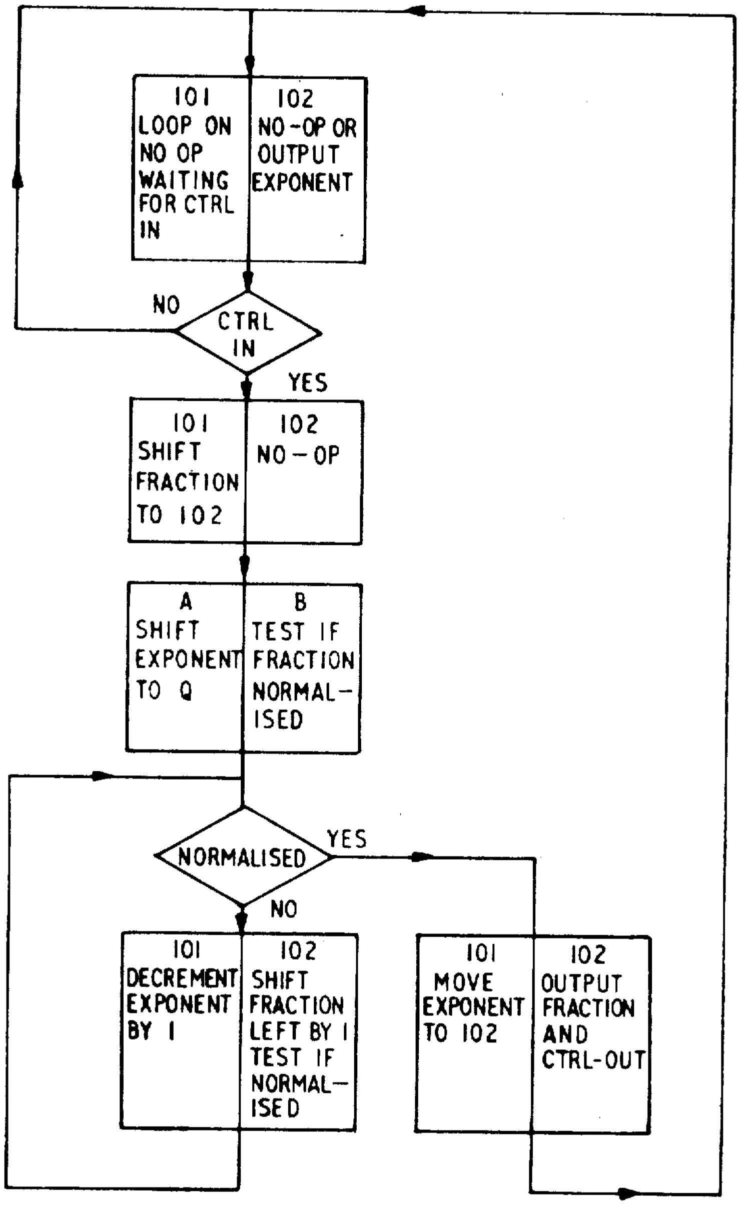

The functions performed by the stores 101 and 102 are shown in the flow sheet of FIG. 11. The exponent is held in store 101 and the fraction in store 101. Each time it is found necessary to shift the fraction, the exponent is decremented by 1. Store 101 has a storage cycle comprising Search, Read, over the respective fields indicated beneath the store. Store 102 on the cycle after the decoder 103 has received a 1 from the F field also performs a Search, Read, over the fields indicated. It will be noted that the S field forms part of both the search field and the field read-out. On the cycle after decoder 103 has received a 0 from the F field, store 102 performs a Next, Read operation. Blank spaces in the Figure, except where a table is indicated, represent storage cells in the X state. The M, N, K, L, V, and W fields are the same for each line of a table but are not repeated in the FIG. 10. The P, Q, R, S, and T fields are each of four bits.

Initially, both stores are idleing, selecting idling, reading their respective words 1. When control in filed M1 is fed at 1, the data in field P of the input/output register at that time is taken as the fraction. The shift table, words 2 to 5 of store 101 is selected and the data in field P is transferred to field R. During the read phase field K1 becomes 01, control-out field V1 is 1, control-in field M2 of store 102 is fed a 1, and the R field is transferred to the S field of the I/O register of store 102. The exponent is now provided from an external source to field P of the I/O register. In the next cycle store 101 selects the shift table of words 6 to 9 and transfers the exponent to field Q. Synchronously store 102, with the K2 field 00 and M2 fields 1, does a Search Read operation over words 2 to 7. If the fraction is already normalized at least word 3 or word 4 is selected, the L2 field becomes 11 and the V2 field becomes 1. If the fraction is not normalized at least one of words 5, 6, and 7 is selected and the L2 field becomes 01 while the F field is changed to 0, calling for a Next, Read operation, and the V2 field remains 0.

We first describe the operation sequence in the latter alternative, e.g. Next Read. At the start of the next cycle the Q field is transferred to the p field of the input/output register and a search is made with the K1 field as 10 and the N1 field as 0. This selects words 10 to 19 of the store which form a decrement table which decreases the value of the exponent in the P field by one and transfers the result to the Q field.

In 102 1102 a Next, Read takes place. To fix ideas, assume that the fraction was 0101 which resulted in the previous cycle in the selection of words 5 and 7 of the store. The Next, Read operation causes the selection and read-out of words 6 and 8. The data in the S field is now 1010 which is a left shift of the fraction resulting in its normalization. This is signalled by the selection of word 8. Word 8 causes the V2 field to become 1 and thus the N1 field of store 101 changes to 1. The L2 and F fields also change to become 11 and 1, respectively. On the next synchronous store cycle, in store 101 the exponent in the Q field is transferred to the R field, due to the selection of words 20 to 23 of the srore because the N1 field is now 1. In store 102 the K2 field is now 11 and words 11 to 14 are selected causing the fraction in the S field to be transferred to the T field and thus to be output from the pipeline. In the next cycle store 101 idles and store 102 repeats its previous operation, the contents of the S field of I/O register now being the exponent which was transferred to the R field in the previous cycle of store 101. It will be noted that if word 8 of store 102 is not selected in the cycle in which the fraction is shifted, the keys and other control information of the stores are not changed and the cycle is repeated.

If the fraction is normalized at the time it first appears in the S field of store 102, word 3 or 4 of the store is selected and the fraction and exponent are transferred successively, as described above, to the T field of source 102.

Pipeline stores can also be arranged so that a store can emit data to the operations decoder of another store of the pipeline, or which controls the mask of another store.

Figure 12:
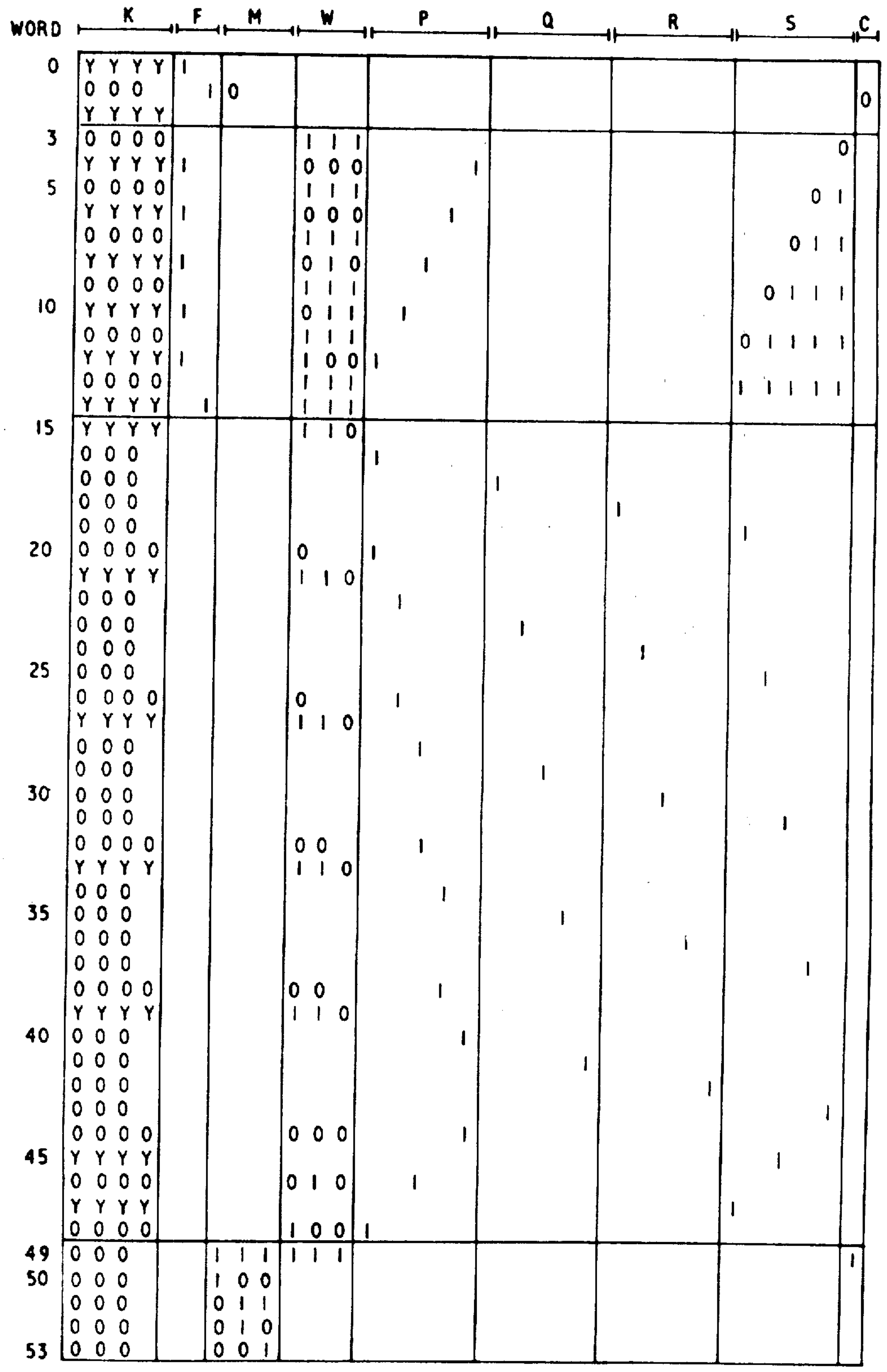
Figure 13:
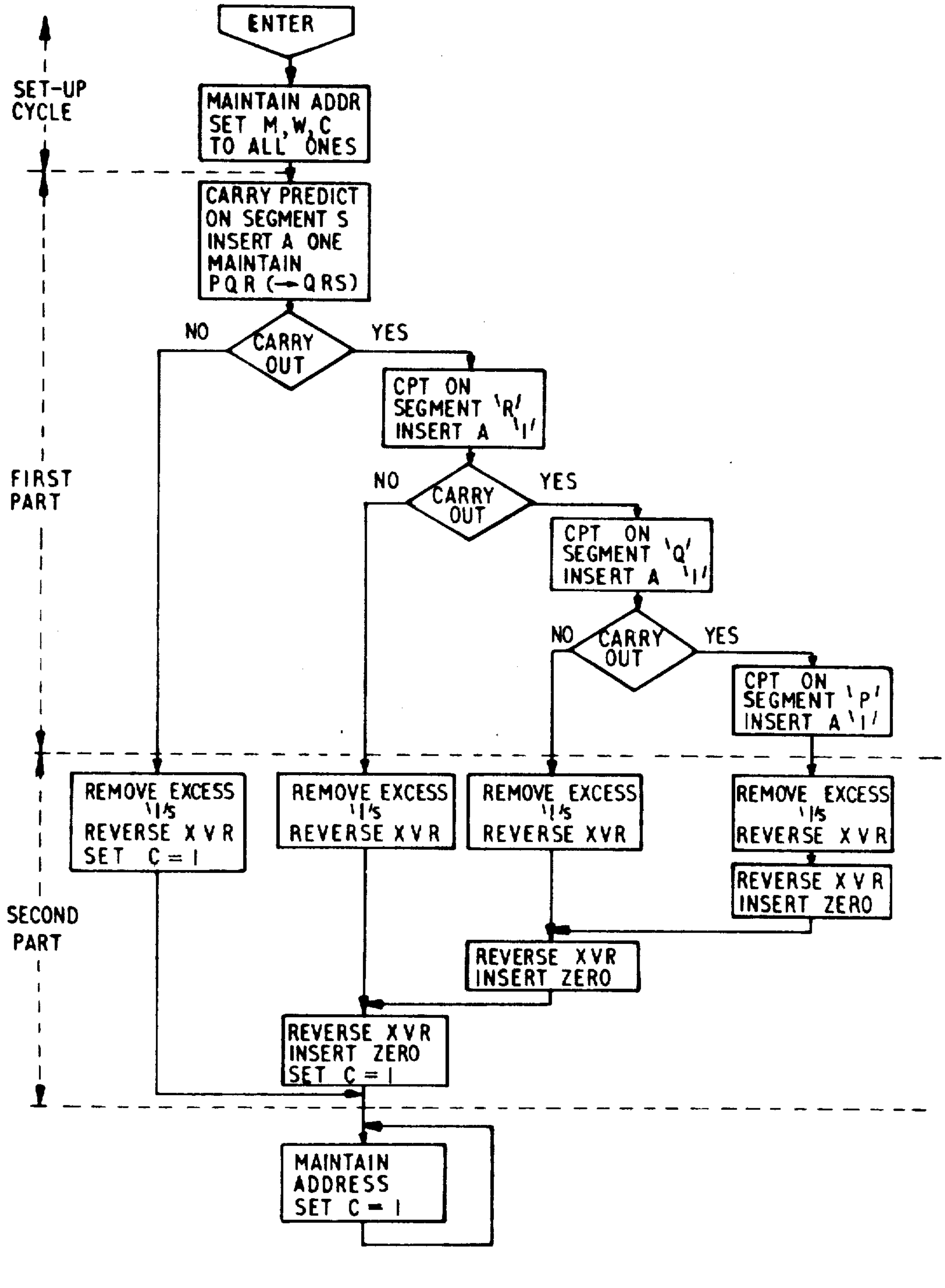

The final example of an auto-sequencing store is that of an increment of decrement table. The 54 word table is shown in FIG. 12 and a flow diagram FIG. 13, shows the sequence of operations. In FIG. 12, blanks represent storage cells in the X state and Y's each represent a cell in the permanent mismatch state. A word with a Y in it cannot be selected directly by a search operation. The input/output register has fields K, F, M, W, P, Q, R, S, and C and the store contains four tables. Words 0 to 2 are a control table. Words 3 to 14 are a carry-predict table. Words 15 to 48 are a cross-over table. Words 49 to 53 are a marker table. The table increments a 20-bit number applied to fields P to S and outputs the result in the same fields. The basic operating cycle is Search over fields K, P, Q, R, S, and Read over fields F, M. W, P, Q, R, S, C. The F field can insert a Next or Previous operation into the cycle in accordance with whether the field has respectively a 1 in the right-hand or hand of its two positions. The table increments the S field or if there is a carry into the R field, the R field is shifted to S field and incremented. The shift is called a cross-over (XVR on FIG. 13) and may be performed more than once if the carry has to ripple thrOugh the Q and P fields. At the end of the incrementing the fields are shifted back until they occupy their initial positions by means of one or more reverse cross-over operations which also remove redundant ones. It is the function of the marker field to count the cross-over operations and ensure that the number of reverse cross-over is the same. As an example consider the incrementing of the number:

$$P=Q=0;\ R=00001;\ S=11111.$$

The key is 0000. The initial operation is search on fields K, P, Q, R, S, Read on fields F, M, W, P, Q, R, S, C. Words 1, 13, 19, 25, 31, 37, 42, 43, and 49 to 53 are selected leading to output fields. F = 01, M = 111, P = Q = 0, R = 00001, S = 11111, and C = 1.

The control bit in the C field is interpreted by the store decoder (not shown) as an instruction to change the mask to the on K, M, W, P, Q, R, S and Read on F, M, W, P, Q, R, S. The F field 01 is interpreted as in instruction to insert a Next operation in the following cycle. During this cycle words 13, 19, 25, 31, 37, 42, 43, and 49 are found to match the search argument, but because of the Next operation words 14, 20, 26, 32, 38, 43, 44, and 50 are read out. Selection of word 13 indicates that there will be a carry out of field S. At the end of this cycle the input/output register holds F = 01, M = 100, W = 111, P = 11111, Q = R = 0, S = 00001, C = 0.

A right cyclic shift of the P to S fields has been performed. During the next cycle of operation the functions performed on the preceding cycle are repeated, but this time it is found that there will be no carry out of S field on incrementing.

The words which match are 5, 16, 22, 28, 34, 40, and 50. The words read out are 6, 17, 23, 29, 35, 41, and 51. At the end of the cycle the input/output register holds

F = 10, M = 011, W = 001, P = 00011, Q = 11111, S = R = 0, C = 0.

The F field is interPreted as calling for a Previous operations to be inserted in the operation cycle. In the following cycle words 1, 17, 23, 29, 34, 35, 38, 41, and 51 match the search argument, causing words 0, 16, 22, 28, 33, 34, 37, 40, and 50 to be read out. The input/output register then holds

F = 10, M = 100, W = 110, P = 11111, Q = R = 0, S = 00010, C = 0.

A cyclic left shift of the data fields has taken place and redundant 1's in the S field have been removed.

Finally, the functions of the last cycle are repeated. Matching words are 16, 22, 28, 34, 37, 40, and 50. Selected words 15, 21, 27, 33, 36, 39, and 49. The input/output register at the end of the cycle contains F = 00, M = 111, W = 111, P = Q = 0, R = 00010, S = 0, C = 1.

The condition bit indicates that the operation is complete.

Figure 14:
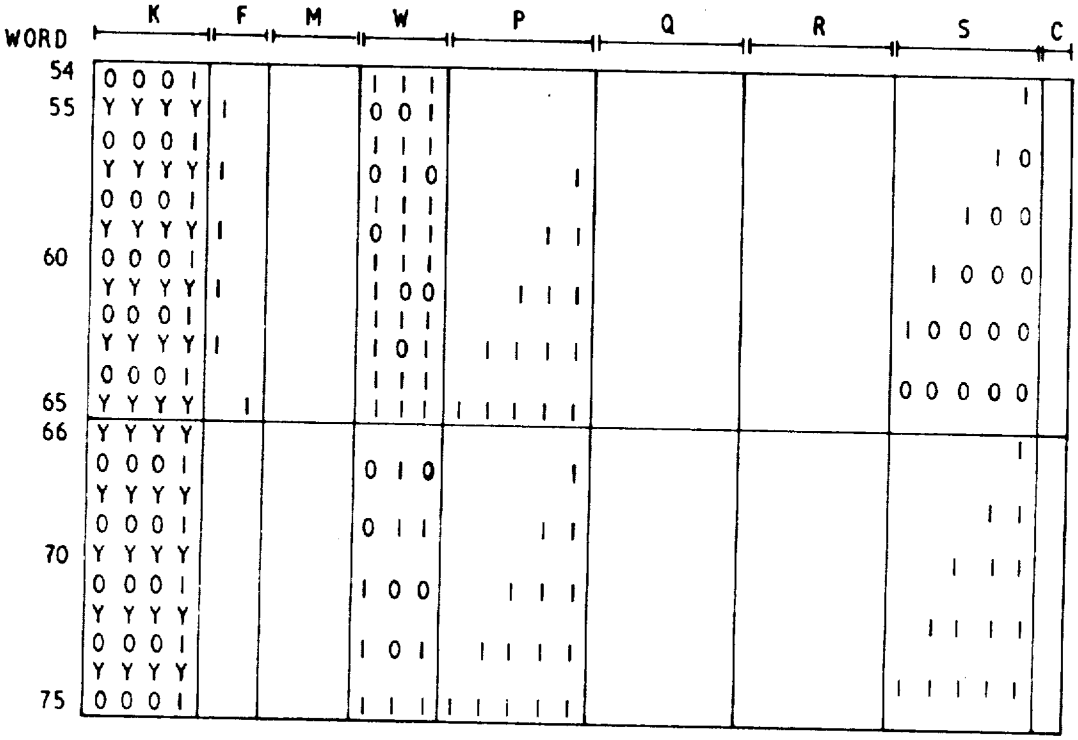

The table can be expanded to cover decrementing as well by adding the words shown in FIG. 14. The key for decrementing is 0001.

There has been described various designs of auto-sequencing associative stores. The stores are capable of performing a sequence of operations independently of external control once the sequence has been initiated. An auto-sequencing store is capable of determining which operations it is to perform during the next store cycle, and/or which mask it is to operate under and/or, at least in part, what the search argument is to be.

While the invention has been particularly shown and described with reference to preferred embodiments thereof, it will be understood by those skilled in the art that the foregoing and other changes in form and details may be made therein without departing from the spirit and scope of the invention.

We claim:

1. In a data processing system of the type in which means are provided for supplying control signals and operand data to an associative storage device for arithmetic and logical processing of the data by table look-up procedures and in which means are provided for receiving processed data from the device, said storage device having search and read cycles of operation and comprising:

a plurality of word storage positions each having a plurality of corresponding fields including an input area having a present key field and a search argument field, and an output area having a next key field, and a result field;

an input/output register having input and output areas for storing a present key, a search argument, and a next key, result output data in respective fields thereof;

means responsive to the control signals for producing search operations to select word positions in accordance with the present key and search argument in the register;

means responsive to the control signals for producing read operations to transfer the next key and result output data of the selected word positions to the register, and means for transferring the next key directly from the next key field of the register to the present key field of the register for use as a present key during the next succeeding search operation.

2. The device of claim 1, further comprising:

new operand and partial result fields within the search argument field of the register, and means effective for transferring the output data in the result field of the register to the partial results field of the register for use during the next search operation.

3. The device of claim 1, wherein each key represents a specific logical function, said device further comprising an operand field within the search argument field Of the register storing arithmetic and logical values to be operated upon, a partial results field within the output data field Of the register storing partial result arithmetic and logical values to be operated upon, a mask field within the output data field of the register, and means including a mask register responsive to output data entered into the mask field during a read cycle for alternating the functions of the operand field and the partial results field of the register whereby partial results of one operation may be used as an operand during the next succeeding operation without transfer of the partial results from an output area to an input area of the register.

4. The device of claim 1, further comprising:

means controlled by output result data for preventing predetermined changes in key data.

5. A method for executing preprogrammed arithmetic and logical routines within an associative store of a data processing system comprising the steps of entering into the store a plurality of arithmetic and logical function multi-word tables, each table adapted to perform a function, identifying each table by means of a key stored in a present key field of each word of the table, inserting in a next key field of each word of a function table, output data corresponding to the key of the next function to be performed in the store, initiating a routine by externally applying a start code to the store as part of a search argument, applying operand data to the store as part of search arguments during search cycles to select words within a table, periodically executing search and read cycles in the store to perform arithmetic and logical functions by table look-up procedures in the function tables using, as part of the search arguments, key output data from immediately preceding functions, and producing a control output signal from the last function word to be executed in the routine.

6. A method for executing preprogrammed arithmetic and logical routines within an associative store of a data processing system comprising the steps of entering into the store a plurality of arithmetic and logical function tables, each table adapted to perform a function, initiating a routine by externally applying a start code to the store as part of a search argument, thereafter performing a sequence of arithmetic and logical functions by table look-up procedures in the function tables using, as part of the search arguments, output data from immediately preceding functions, externally applying operand data to the store as part of the search arguments, and producing a control output signal from the last function to be executed in the routine.

7. The method set forth in claim 6 further comprising the step of producing control output signals during read cycles for accessing external operand data.

8. The method set forth in claim 7 further comprising the step of applying key data outputs from performed functions as a part of search arguments to select tables for performing next succeeding functions.

9. The method set forth in claim 8 further comprising the step of applying partial result outputs from performed functions as a part of search arguments to select the parts of tables for performing next succeeding functions.

10. The method set forth in claim 9 further comprising the step of applying search/access outputs from performed functions as mask data to alternate the roles of search argument fields and partial result output fields in input/output register of the store, thereby to avoid the need for transferring the partial result outputs from an output field to a search argument field in an output register.

* * * * *